United States Patent
Smith et al.

(10) Patent No.: US 11,449,917 B2
(45) Date of Patent: Sep. 20, 2022

(54) NETWORK COMPUTING SYSTEM FOR PROVIDING INTERACTIVE MENUS AND GROUP RECOMMENDATIONS

(71) Applicant: Uber Technologies, Inc., San Francisco, CA (US)

(72) Inventors: Paul Clayton Smith, San Francisco, CA (US); Andrew Timothy Szybalski, San Francisco, CA (US); William Danner, San Francisco, CA (US); Michael Stumpo, San Franciscco, CA (US); Sonya Ives, San Francisco, CA (US); Clare O'Brien, San Francisco, CA (US); Wendi Chiong, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 16/122,675

(22) Filed: Sep. 5, 2018

(65) Prior Publication Data

US 2020/0074524 A1 Mar. 5, 2020

(51) Int. Cl.
G06Q 30/00 (2012.01)
G06Q 30/06 (2012.01)
G06Q 50/12 (2012.01)
G06Q 10/08 (2012.01)

(52) U.S. Cl.
CPC ....... *G06Q 30/0631* (2013.01); *G06Q 10/083* (2013.01); *G06Q 30/0643* (2013.01); *G06Q 50/12* (2013.01)

(58) Field of Classification Search
CPC ..... G06Q 30/0601–0645; G06Q 30/08; G06Q 30/0631; G06Q 30/0643; G06Q 50/12; G06Q 10/083

USPC .............................................. 705/26.1–27.2
See application file for complete search history.

(56) References Cited

U.S. PATENT DOCUMENTS

| | | |
|---|---|---|
| 6,862,572 B1 | 3/2005 | de Sylva |
| 8,315,802 B2 | 11/2012 | Brown |
| 9,754,331 B1 | 9/2017 | Beckelman |
| 9,993,735 B2 | 6/2018 | Aghdaie |
| 10,026,055 B2 | 7/2018 | Riel-Dalpe |

(Continued)

FOREIGN PATENT DOCUMENTS

| | | |
|---|---|---|
| CN | 104751272 | 7/2015 |
| JP | 2013218376 A | * 10/2013 |

(Continued)

OTHER PUBLICATIONS

"The Development of Mobile Culinary Recommendation System Based on Group Decision Support System," by R. K. Dewi, M. T. Ananta, L. Fanani, K. C. Brata, and N. D. Priandani, Internat. Journal of Interactive Mobile Technologies 12.3: 209-216, Internat. Association of Online Engineering, Aug. 23, 2018 (Year: 2018).*

(Continued)

*Primary Examiner* — Anne M Georgalas
(74) *Attorney, Agent, or Firm* — Dority & Manning, P.A.

(57) ABSTRACT

A network computing system provides an interactive menu to enable a consumer to initiate an order session. The network computing system can detect the order session is for placement of a group order, and can further provide a recommendation to the requesting consumer with respect to personalizing the group order for individual members of the group.

26 Claims, 8 Drawing Sheets

(56) References Cited

U.S. PATENT DOCUMENTS

| | | |
|---|---|---|
| 10,029,787 B1 | 7/2018 | Lesser |
| 10,133,995 B1 | 11/2018 | Reiss |
| 10,156,449 B2 | 12/2018 | Colijin |
| 10,308,430 B1 | 6/2019 | Brady |
| 10,360,616 B2 | 7/2019 | Lopez |
| 10,366,434 B1* | 7/2019 | Belousova ......... G06Q 30/0627 |
| 10,445,672 B2 | 10/2019 | Renfroe |
| 10,467,562 B1 | 11/2019 | Mo |
| 10,467,563 B1 | 11/2019 | Mo |
| 10,586,273 B1 | 3/2020 | Kohli |
| 10,664,933 B2* | 5/2020 | Mimassi ............... G06Q 50/12 |
| 10,748,190 B2* | 8/2020 | Kim .................. G06Q 30/0269 |
| 2001/0047285 A1 | 11/2001 | Borders |
| 2002/0152128 A1 | 10/2002 | Walch |
| 2002/0188492 A1 | 12/2002 | Borton |
| 2004/0030572 A1 | 2/2004 | Campbell |
| 2004/0210621 A1 | 10/2004 | Antonellis |
| 2004/0260470 A1 | 12/2004 | Rast |
| 2005/0209913 A1 | 9/2005 | Wied |
| 2007/0033087 A1 | 2/2007 | Combs |
| 2007/0088624 A1* | 4/2007 | Vaughn .................. G06Q 30/02 705/26.81 |
| 2008/0046326 A1 | 2/2008 | Horstemeyer |
| 2008/0195428 A1 | 8/2008 | O'Sullivan |
| 2009/0048890 A1 | 2/2009 | Burgh |
| 2010/0153279 A1 | 6/2010 | Zahn |
| 2011/0258134 A1 | 10/2011 | Mendez |
| 2011/0307282 A1 | 12/2011 | Camp |
| 2012/0203619 A1 | 8/2012 | Lutnick |
| 2012/0253878 A1 | 10/2012 | Forstall |
| 2013/0218727 A1 | 8/2013 | Lutnick |
| 2013/0218967 A1* | 8/2013 | Chau ..................... G06Q 50/01 709/204 |
| 2014/0011522 A1 | 1/2014 | Lin |
| 2014/0026054 A1 | 1/2014 | Wang |
| 2014/0058902 A1* | 2/2014 | Taylor ................... G06Q 30/06 705/26.81 |
| 2014/0108201 A1 | 4/2014 | Franchette |
| 2014/0164126 A1 | 6/2014 | Nicholas |
| 2014/0172739 A1 | 6/2014 | Anderson |
| 2014/0188750 A1 | 7/2014 | Seiler |
| 2014/0214465 A1* | 7/2014 | L'Heureux ........ G06Q 30/0603 705/7.13 |
| 2014/0229099 A1 | 8/2014 | Garrett |
| 2014/0278635 A1 | 9/2014 | Fulton |
| 2014/0370167 A1 | 12/2014 | Garden |
| 2015/0088671 A1* | 3/2015 | Xiong .................... G06Q 50/12 705/15 |
| 2015/0142640 A1 | 5/2015 | Kneen |
| 2015/0154538 A1 | 6/2015 | Skaaksrud |
| 2015/0204684 A1 | 7/2015 | Rostamian |
| 2015/0223024 A1 | 8/2015 | Abuodeh |
| 2015/0227980 A1* | 8/2015 | Eberhardt ............. G16H 20/60 705/14.66 |
| 2015/0248689 A1 | 9/2015 | Paul |
| 2015/0262121 A1 | 9/2015 | Riel-Dalpe |
| 2015/0278926 A1* | 10/2015 | Fang ................... G06Q 30/0635 705/15 |
| 2015/0310379 A1 | 10/2015 | Farrelly |
| 2015/0347964 A1 | 12/2015 | Taylor |
| 2015/0363843 A1 | 12/2015 | Loppatto |
| 2016/0012391 A1 | 1/2016 | Burnett |
| 2016/0019496 A1 | 1/2016 | Gorlin |
| 2016/0027079 A1 | 1/2016 | Schoeffler |
| 2016/0034845 A1 | 2/2016 | Hiyama |
| 2016/0035248 A1* | 2/2016 | Gibbs ..................... G09B 5/02 434/127 |
| 2016/0042303 A1 | 2/2016 | Medina |
| 2016/0078516 A1 | 3/2016 | Alnuwaysir |
| 2016/0104112 A1 | 4/2016 | Gorlin |
| 2016/0104113 A1 | 4/2016 | Gorlin |
| 2016/0132792 A1 | 5/2016 | Rosnow |
| 2016/0140589 A1 | 5/2016 | Deshpande |
| 2016/0148306 A1* | 5/2016 | Bellavance ........ G06Q 30/0641 705/15 |
| 2016/0171439 A1 | 6/2016 | Ladden |
| 2016/0171542 A1 | 6/2016 | Fanous |
| 2016/0171584 A1 | 6/2016 | Cao |
| 2016/0210591 A1 | 7/2016 | Lafrance |
| 2016/0328669 A1 | 11/2016 | Droege |
| 2016/0353235 A1 | 12/2016 | Williams |
| 2017/0024789 A1 | 1/2017 | Frehn |
| 2017/0093803 A1 | 3/2017 | Nayshtut |
| 2017/0116566 A1 | 4/2017 | Walton |
| 2017/0270794 A1 | 9/2017 | Sweeney |
| 2017/0290345 A1 | 10/2017 | Garden |
| 2017/0337511 A1 | 11/2017 | Shroff |
| 2018/0025298 A1 | 1/2018 | Baggott |
| 2018/0067620 A1 | 3/2018 | Adler |
| 2018/0075514 A1* | 3/2018 | Madhvanath .......... G06Q 50/01 |
| 2018/0089621 A1 | 3/2018 | Perez Barrara |
| 2018/0188068 A1 | 7/2018 | Droege |
| 2018/0189729 A1 | 7/2018 | Droege |
| 2018/0202818 A1 | 7/2018 | Zhang |
| 2018/0225796 A1 | 8/2018 | Liu |
| 2018/0231984 A1 | 8/2018 | Alonso-Mora |
| 2018/0253805 A1* | 9/2018 | Kelly ................... G06Q 20/322 |
| 2018/0300660 A1 | 10/2018 | Coan |
| 2018/0308038 A1 | 10/2018 | Zhou |
| 2018/0336510 A1 | 11/2018 | DaCosta |
| 2018/0374386 A1* | 12/2018 | Benefield ........... A63B 71/0686 |
| 2019/0026662 A1* | 1/2019 | Kring ................. G06Q 10/0631 |
| 2019/0035037 A1 | 1/2019 | Chase |
| 2019/0064801 A1 | 2/2019 | Frazzoli |
| 2019/0113361 A1 | 4/2019 | Droege |
| 2019/0114583 A1 | 4/2019 | Ripert |
| 2019/0130260 A1 | 5/2019 | Han |
| 2019/0130320 A1 | 5/2019 | Friend |
| 2019/0130350 A1 | 5/2019 | Nguyen |
| 2019/0130354 A1 | 5/2019 | Han |
| 2019/0132699 A1 | 5/2019 | Nikulkov |
| 2019/0132702 A1 | 5/2019 | Ehsani |
| 2019/0163710 A1* | 5/2019 | Haghighat Kashani ..................... G06Q 30/0261 |
| 2019/0289427 A1 | 9/2019 | Lin |
| 2019/0295440 A1* | 9/2019 | Hadad ................... G06F 40/216 |
| 2020/0033156 A1 | 1/2020 | Droege |
| 2020/0065734 A1 | 2/2020 | Szybalski |
| 2020/0074524 A1 | 3/2020 | Smith |
| 2020/0090248 A1 | 3/2020 | Zeng |
| 2020/0151660 A1 | 5/2020 | Warr |
| 2020/0160264 A1 | 5/2020 | Silverman |
| 2020/0265366 A1 | 8/2020 | Mo |
| 2020/0311618 A1 | 10/2020 | Eichler |
| 2020/0333161 A1 | 10/2020 | Droege |
| 2020/0374650 A1 | 11/2020 | Jung |
| 2021/0081880 A1 | 3/2021 | Bivins |

FOREIGN PATENT DOCUMENTS

| | | |
|---|---|---|
| KR | 10-2014-0101501 | 8/2014 |
| KR | 10-20170054739 | 5/2017 |
| WO | WO 2001052163 | 7/2001 |
| WO | WO 2017/148202 | 9/2017 |
| WO | WO 2018/209263 | 11/2018 |

OTHER PUBLICATIONS

ISR and Written Opinion in PCT/US2018/058554 dated Feb. 13, 2019.
ISR and Written Opinion in PCT/US2018/058859 dated Feb. 20, 2019.
Reutt, Alex "Deliveroo Frank About Improved Algorithm Improving Service Times by 31%", Oct. 17, 2017 (https://www.itwire.com/home-it/ 80398- deliveroo-frank-about-improved-algorithm- improving-service-times-by-31 .html).
ISR and Written Opinion in PCT/US2019/051993 dated Sep. 19, 2019.
HungryBBQ Delivery Details, Sep. 11, 2019 www.hungrybbq.com/delivery_info.php.

(56) References Cited

OTHER PUBLICATIONS

Eatzcatering FAQ, Nov. 13, 2018 www.eatzcatering.com.
Written Opinion in PCT/US2018/058859 dated Oct. 21, 2019.
IPRP dated Nov. 7, 2019 in PCT/US2018/058554.
Technological Disruption and Innovation in Last-Mile Delivery, Stanford Value Chain Innovation Initiative, Stanford, Jun. 2016.
Collaborative Urban Logistics: Synchronized Last-Mile Logistics for Sustainable, Efficient Urban Delivery, TLI Asia Pacific White Paper Series, vol. 13, Nov. 2013.
Grand Junction Local Delivery Reinvented—Last Mile Platform Help, Grand Junction Inc., PerfectLastMile.com, 2016.
Computerised Vehicle Routing and Scheduling (CVRS) for Efficient Logistics, Department for Transport, 2005.
Mabe, John, The 'Uber-for-X Model' and the Complexity of On-Demand Delivery, Techgistics, Dec. 1, 2016.
Singliar, Tomas, Demand Forecasting for Shipping and Distribution, Azure AI Gallery, Jun. 26, 2017.
Chen, P., Crowdsourced Delivery for Last-Mile Distribution: An Agent-Based Modeling and Simulation Approach, IEEE, 2017.
IPRP dated Aug. 25, 2020 in PCT/US2019/051993.

\* cited by examiner

NETWORK COMPUTING SYSTEM FOR PROVIDING INTERACTIVE MENUS AND GROUP RECOMMENDATIONS

TECHNICAL FIELD

Examples described herein relate to a network computing system for providing interactive menus and group recommendations.

BACKGROUND

Numerous on-demand services exist to offer users a variety of services: transportation, shipping, food delivery, groceries, pet sitting, mobilized task force and others. Typically, on-demand services leverage resources available through mobile devices, such as wireless (e.g., cellular telephony) devices, which offer developers a platform that can access sensors and other resources available through the mobile device. Many on-demand services include dedicated applications (sometimes referred to as "apps") to communicate with a network service through which an on-demand service is offered.

DETAILED DESCRIPTION

Figure 1:
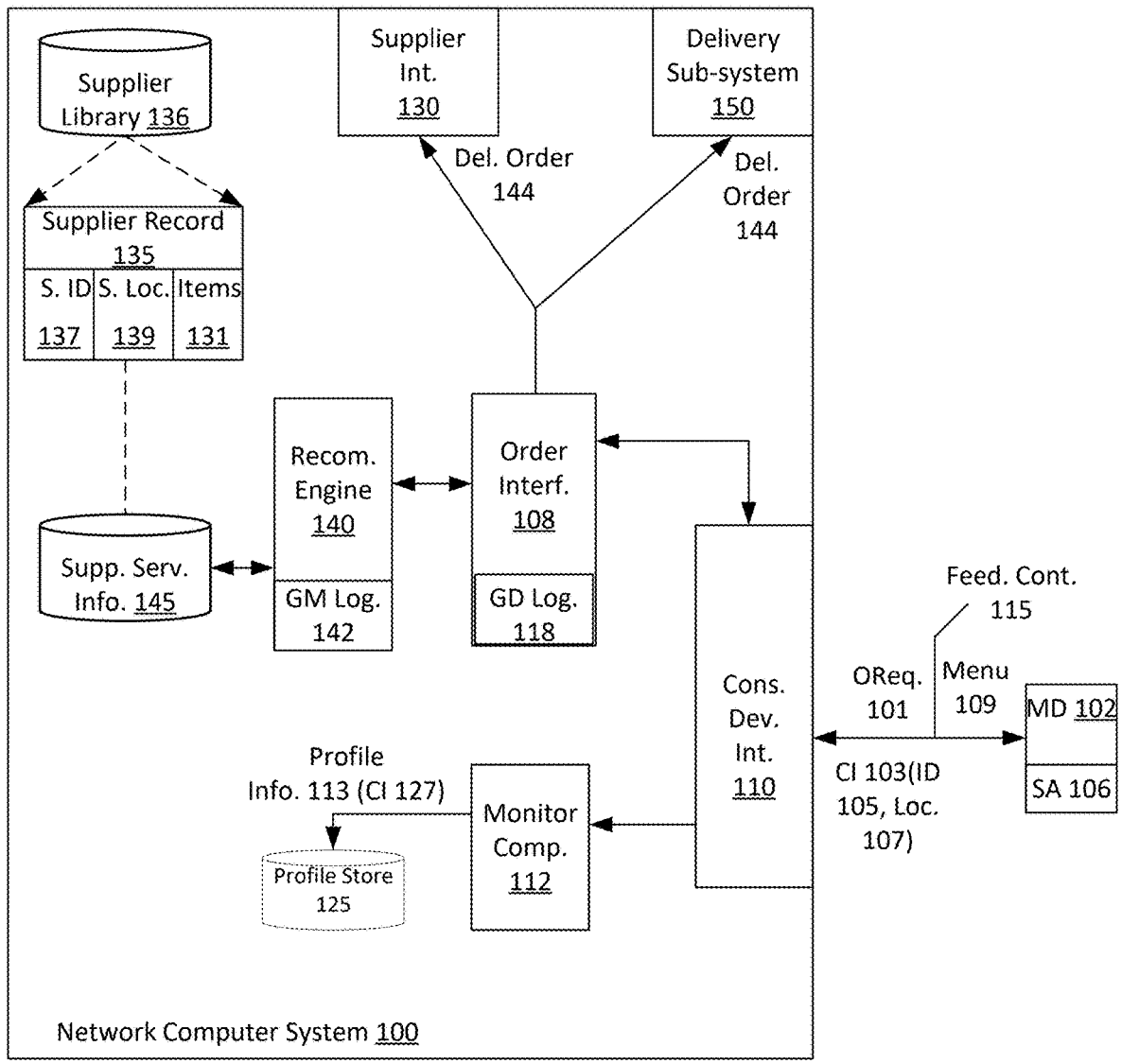
FIG. 1 illustrates a network computing system to provide recommendations for items for a delivery order, according to one or more examples.

Examples provide for a network computing system to provide a recommendation engine for making recommendations to order requests of consumers. In examples, the network computing system provides an interactive menu to a requesting consumer, to facilitate the requesting consumer to initiate an order session for a group (e.g., a household member initiates an order session for other members of the household). During the order session, the network computing system can generate recommendations to facilitate the requesting consumer in selecting prepared food items. In some examples, the recommendations can accommodate a preference for a prepared food item by one of the members of the group other than the requesting consumer.

In variations, the recommendation can pertain to a quantitative metric, such as portion, size and/or calorie intake, to encompass decisions such as whether the consumer should request a shared or single dish. In other variations, the recommendation can reflect (i) one of the consumers of the group participating in an activity during an interval preceding the order session, and/or (ii) a dietary restriction or goal (e.g., caloric goal or diet) of one or more of the consumers of the group.

In some examples, a user interface feature can be provided with the interactive menu to display information that indicates a completeness of the order session, and more specifically, a cumulative value of a quantitative metric (e.g., total calories, total portions) of prepared food items which the requesting consumer has requested.

According to examples, a network computing system implements processes to recommend food items to a respective consumer, in connection with a food delivery service. In some examples, the network computing system implements processes that are responsive to group orders, and further generates group specific recommendations for a requesting consumer based on information that is obtained or otherwise known about the consumer's group, or the members of the group.

In additional examples, a network computing system provides an interactive menu to enable a consumer to initiate an order session. The network computing system can detect the order session is for placement of a group order, and can further provide a recommendation to the requesting consumer with respect to personalizing the group order for individual members of the group.

In additional examples, a network computing system provides an interactive menu of food items to a requesting consumer device. The network computing system can detect an order session initiated on a requesting consumer device, and associate the order session with a group of consumers that include the requesting consumer. In examples, the network computing system can retrieve, from a data store, a consumption profile for one or more consumers of the group. The network computing system can further generate, based at least in part on (i) the retrieved consumption profile of the one or more consumers, and (ii) an interaction between the requesting consumer and the interactive menu, a recommendation for one or more food items, where the recommendation is provided during the order session as content that is output to the requesting consumer device. In response to receiving input from the requesting consumer device that completes the order session, the network computing system can communicate one or more order requests from the order session to one or more food preparation sources, where the one or more order requests specify multiple prepared food items.

Among other advantages and technical benefits, examples enable requesting consumers to readily place group orders in connection with delivery orders, using recommendations that are selected for the group and/or personalized and/or members of the group. This allows the requesting consumer to place a delivery order for a group in order to receive food items that individuals of the group are likely to want and appreciate. Examples recognize that under conventional approaches, the use of mobile devices can sometimes inhibit a requesting consumer from fully sharing information about food items that are available through a delivery service, as the requesting consumer may have to share a small screen where the menu information is provided with other consumers, or real aloud the menu items (in which case the other consumers do not get the benefit of viewing pictures). In situations where the requesting consumer may now know what other consumers in the group may want, the result may be that multiple individuals participating in a group order will open their respective applications and view menu items on their own. This can waste computing resources, and also generate false signals to the ordering system, which may track each viewing consumer as a potential independent order. To address such problems, examples are described which enable the requesting consumer to rely on a specific and personalized set of recommendations for the group and/or its members. The requesting consumer can make selections for the group using the recommendations of the network computing system, which in turn can reduce the level of interaction amongst members of the group with the network food delivery service, and also reduce the occurrence of false signals that would otherwise be generated by a consumer viewing menu content on one device, while another consumer orders on another device.

As used herein, a client device refers to devices corresponding to desktop computers, cellular devices or smartphones, wearable devices, laptop computers, tablet devices, television (IP Television), etc., that can provide network connectivity and processing resources for communicating with the system over a network.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates a network computing system to provide recommendations for items for a delivery order, according to one or more examples. With respect to examples as described, a network computing system 100 can be implemented on a server, on a combination of servers, and/or on a distributed set of computing devices which communicate over a network such as the Internet. Still further, some examples provide for the network computing system 100 to be distributed using one or more servers and/or mobile devices. In some variations, the network computing system 100 is implemented as part of, or in connection with a network system, where, for example, operators use service vehicles to provide transport-related services between locations. In variations, the network computing system 100 may be implemented using mobile devices of users, including service providers and requesters, with the individual devices executing a corresponding service application that causes the computing device to operate as an information inlet and/or outlet for the network computing system 100.

In some examples, the system 100 implements a network platform, in connection with applications that run on mobile devices of the population of users. The users can include those who order items from the delivery service through their respective computing device ("requesting consumer"), as well as those who receive items from the delivery service as part of a group (collectively termed "consumers" in examples as described).

In examples, the system 100 includes a consumer device interface 110, a monitoring component 112, an order interface 108, a supplier interface 130, and a recommendation engine 140. In some examples, the system 100 can also include a delivery sub-system 150. In variations, the system 100 can implement an interactive menu and recommendation service, in connection with one or more delivery sub-systems, which may include third-party delivery services.

The consumer device interface 110 includes or performs processes that run on the network-side of the system 100 to establish communication channels with individual devices of consumers. The consumers may operate mobile devices (represented in FIG. 1 by the mobile device 102) on which a corresponding service application 106 may execute. The consumers may operate respective service applications 106 to request delivery services, and in some variations, other types transport-related services, such as human transport between a start location (or pickup location) and a destination (or drop-off). When the service application 106 is launched on the mobile device 102, the mobile device 102 may transmit consumer information 103 to the system 100. The consumer information 103 may include an account identifier 105, as well as the current location 107 of the mobile device 102, which the service application 106 may obtain by interfacing with a satellite receiver or other location-aware resource of the mobile device 102. As described in greater detail, the consumer information 103 can also be communicated with an order request 101. In some variations, at least some of the consumer information 103 (e.g., current location) may be communicated before an order request 101 is made from the mobile device 102.

The consumer device interface 110 can use an application programming interface (API), such as an externally facing API, to communicate data with the consumer devices 102 in the population of users. By providing the externally facing API, the system 100 can establish secure communication channels via secure access channels over the network through any number of methods, such as web-based forms, programmatic access via RESTful APIs, Simple Object Access Protocol (SOAP), remote procedure call (RPC), scripting access, etc.

The system 100 can communicate, via the consumer device interface 110, with computing devices of a population of consumers. The consumers can correspond to persons who order and/or consume food items through a delivery service provided by the network computing system 100. The mobile devices 102 can utilize a respective service application 106 to communicate with the system 100. The consumer device interface 110 includes or performs processes that run on the network-side of the system 100 to establish communication channels with individual devices of consumers. The consumers may operate mobile devices on which a corresponding service application 106 may execute. The consumers may operate respective service applications 106 to request delivery services, and in some variations, other types transport-related services, such as human transport between a start location (or pickup location) and a destination (or drop-off).

The order interface 108 can implement processes for communicating an interactive menu 109 to the mobile device 102, via the consumer device interface 110, where the interactive menu 109 can be rendered by the service application 106. The order interface 108 can also process the inputs of the consumer, which may be received via the consumer device interface 110, in order to record food items of the consumer's selection. When the user finishes specifying food items for delivery, the order interface 108 can also generate a delivery order 144 that is communicated to one or more suppliers (via a supplier interface 130), as well as a delivery sub-system 150.

The interactive menu 109 menu can be structured to include menu items corresponding to dishes or other prepared food items from one or multiple suppliers (e.g., restaurant). In an example, the order interface 108 uses the current location 107 of the requesting mobile device 102 to select suppliers, from which sub-menus (e.g., supplier specific menus) and/or menu items can be are provided as part of the interactive menu 109. For example, the interactive menu 109 can display food items and other offerings of suppliers (e.g., restaurants) that are within a range of the current location of the requesting consumer. As described with some examples, the interactive menu 109 can alternatively be structured to list food items by preference, with the requesting consumer having the ability to make a batch delivery order request (e.g., one deliverer brings food items from multiple restaurants at one time).

An ordering consumer can initiate an order session through use of the interactive menu 109. The interactive menu 109 can enable the consumer to search, review and select prepared food items for a delivery order, where the prepared food items are delivered to a given location (e.g., the location of the consumer). In examples, the interactive menu 109 can be provided by the service application 106 running on the consumer's mobile device 102.

In some examples, the system 100 maintains a supplier library 136, which includes a record 135 for each supplier (e.g., restaurant, professional kitchen) of prepared food items. Each supplier record 135 may associate a respective supplier with an account identifier 137, as well as a supplier location 139 and a set of food items 131 that can be prepared for delivery by that supplier. The supplier interface 130 may correspond to a programmatic interface that transmits order requests from consumers to a terminal of a supplier. In the context of food delivery, the supplier interface 130 transmits delivery orders to a computer system (e.g., reservation ordering system, point-of-sale device, dedicated take-out terminal, etc.) of the supplier. In some examples, the supplier may operate a mobile device on which a service application for suppliers is provided, in order to receive order requests from the system 100. The supplier may access the system 100 via, for example, a website or application interface (e.g., supplier service application) in order to accept order requests, as well as to provide information as to the preparation status of an order request. Additionally, the supplier may access the system 100 in order to provide menus or descriptions (including text and images) of available items for delivery through the system 100.

In examples, the supplier may specify the items 131 via the supplier interface 130. The supplier items 131 may be provided as an electronic document, or combination of records provided by the supplier, which can be retrievable and rendered on a mobile device 102 in the form of, for example, an interactive menu 109. By way of example, the supplier items 131 may include a restaurant menu, or items for a restaurant menu.

In some examples, the records 135 of the supplier library can be associated with supplemental service information 145. The supplemental service information 145 can include nutritional information for food items that are provided through the interactive menu 109. As an addition or variation, the supplemental service information 145 can include an ingredient list and/or an ingredient type classification (e.g., "non-dairy" designation). Still further, the supplemental information 145 can include an estimated time of preparation of the food item. The supplemental service information 145 can be specific to the particular supplier, based on, for example, information obtained from the supplier or from interacting with the supplier (e.g., measuring wait times for preparation of specific food items). Still further, in other variations, the supplemental service information 145 can be generic to the type of food item.

In examples, a monitoring component 112 processes the consumer information 103 to identify profile information that is relevant to the consumer's consumption and use of services provided through the system 100 ("profile information 113"). The profile information 113 can be indicative of a preference, tendency or objective of the consumer with respect to services requested through system 100. The monitoring component 112 may store the profile information 113 in a profile store 125, in association with a consumer identifier 127, where the consumer identifier identifies an account, device or other identifier of the computing device (or service application) that corresponds to the consumer identifier 103. As an addition or alternative, the consumer identifier 127 can identify a consumer by a profile identifier that is linked to the account or device of another consumer. For example, in a household, a parent may be associated with a device or account identifier, while the profile information 113 of a child is only identified by a profile identifier that is linked to the account or device identifier of the parent.

According to examples, the monitoring component 112 can record information about events or activities relating to prior delivery orders of the consumer, or which the consumer was a part of ("historical food delivery profile information"). The prior delivery orders can be specific to those made through the service application 106 and/or through a third-party service. The historical food delivery profile information may identify information about prior delivery orders of the consumer, such as the specific supplier (e.g., restaurant), prepared food item (e.g., specific dish), specific instruction for food preparation (e.g., prepare steak to medium), as well as genre (e.g., "Italian"), category ("Pasta") and sub-category ("alfredo") for the prepared food item, portion size, side dishes or electives the consumer made (e.g., extra parmesan cheese). Still further, the historical food delivery profile information can include information that is indicative of food items of interest to the consumer, such as food items which the consumer placed in a "cart" (or checkout bin) for purchase, as well as food items and/or suppliers which the consumer searched or reviewed information on.

In some examples, the historical food delivery profile information can also identify locations where the user made specific orders, such as home or work locations. The historical food delivery profile information can also associate location (including designations, such as whether the consumer was at work or at home) or other contextual information (e.g., weather, including temperature, sunny versus rain, etc.). In addition, the historical food delivery profile information can identify when delivery orders were placed as a group order, meaning an order that was intended to feed more than one consumer. The historical food delivery profile information can also identify a group size, or information about the members of the group for which a group delivery order was made, including the age, gender or consumption size of the members of the identified group.

In examples, the monitoring component 112 can monitor for activities of the user, in order to obtain activity profile information. In some examples, the activity profile information can categorize a time interval preceding a consumer's current delivery request. The monitoring component 112 can categorize a preceding portion of the consumer's day, for example, as being "normal", "light" or "heavy", with the categorical determination weighing factors such as the type of food item or proportion the consumer may appreciate at the time of the current delivery request. The categorization can be based on, for example, the amount of time the consumer spent at a given location (e.g., work location), the amount of time the consumer spent commuting and/or the distance commuted, the number of places which coincided with the consumer's location, and their respective span.

As an addition or variation, the activity profile information can include information obtained from activity monitoring resources of the consumer. For example, the service application 106 can interface with an activity monitoring application running on the same device (e.g., jogger tracking application) in order to obtain information about (i) an exercise the consumer performed, (ii) a duration of the exercise, (iii) an amount of exertion the consumer expended in performing the exercise (e.g., heart rate profile, calories burned, etc.), and/or (iv) contextual information relating to the user performing the exercise, such as when the user performed the exercise or the weather while the user performed the exercise. As described in greater detail, such activity profile information can be used to weigh food item selection, quantity, and supplier selection (e.g., to identify a duration until food is prepared and delivered).

In some examples, the profile information 113 that is associated with consumer identities 127 can include lifestyle preferences and/or dietary restrictions. The consumer device interface 110 can determine lifestyle preferences and/or dietary restrictions from the user via the service application 106. For example, the user may specify input that identifies restrictions on foods based on allergies, medical condition, and/or religious beliefs. Similarly, the consumer can specify preferences for or against specific food items based on a fitness objective (e.g., to lose weight, maintain a given weight, gain muscle mass, reduce cholesterol levels, improve vitamin intake, etc.). In variations, the service application 106 can interface with other applications or data sources to determine lifestyle preferences and/or dietary restrictions of the user. Still further, the monitoring component 112 can infer information about the lifestyle preferences and/or dietary restrictions of the user by detecting, for example, eating habits (e.g., through historical analysis of delivery orders) and exercise habits (e.g., through activity information reflecting user exercise) of the user.

The monitoring component 112 and the service application 106 can alternatively request health-related profile information from the user, such as age, height and weight, from which one or more aspects of the user's lifestyle preferences and/or dietary restrictions can be inferred. As an addition or alternative, the monitoring component 112 may also prompt or request input from the consumer as to preferences for food items, such as by genre, or as to specific suppliers (e.g., restaurants).

In examples, the food item ordering process can be initiated through a service application 106 that runs on the consumers computing device 102. When launched, the service application 106 can communicate a current location 107 of the respective computing device 102 to the consumer device interface 110. The order interface 108 can use the current location 107 to select the interactive menu 109 for rendering on the respective computing device 102, via the service application 106. The consumer can initiate the order process by opening the interactive menu 109 using the service application, and further selecting food items from the interactive menu 109. In selecting the food items for a delivery order, the user can perform a search for a supplier, type of food, or specific prepared food item (e.g., hamburger). When selections are made, the order interface 108 queues a delivery order for one or multiple suppliers, and when the ordering process is complete, the order interface 108 communicates a delivery order to one or more suppliers 130 via the supplier interface.

In examples, the order interface 108 can implement group detection logic 118 to detect that an ordering process initiated by a consumer is intended for a group of consumers. In examples, the order interface 108 can implement the group detection logic 118 to automatically detect a delivery order request that is initiated, or otherwise in progress, as being a group order, based on stored information that pre-associates the consumer identifier 127 of the requesting consumer with one or more profiles of other consumers. For example, the order interface 108 can reference the consumer identifier 127 against the respective consumer profile in the profile store 125, to determine that the consumer is associated with a group of specific members when prior delivery orders have been made for the group by that consumer. In variations, the order interface 108 can also reference the consumer identifier 127 against the user profile to determine that the consumer is associated with a group of specific members from which prior delivery orders have been made by another member of the group.

Still further, in other variations, the other members which may be pre-associated with the requesting consumer can be identified generally and/or by classification. For example, the consumer can be identified as being part of a group of four consumers, or alternatively, part of a group of four consumers, where there is one other adult and two children.

As another addition or variation, individual consumers may be associated with multiple groups (e.g., work group, homework). In some examples, the profile store 125 can associate groups with location or other contextual information (e.g., time of day, day of week). In such examples, the group which a particular consumer is pre-associated with may be based on the consumer's location and/or other contextual information, such as the time of day or day of week.

Still further, the order interface 108 can further implement the group detection logic 118 to use additional signals as detected from the consumer computing device 102 and/or other sources when making the group determination. For example, the order interface 108 can use the consumer identifier 127, the current location 107 as transmitted from the consumer computing device 102, and the pre-association of the consumer identifier 127 to one or more other consumers, to determine that the ordering process initiated by the consumer is for a group order. Still further, the order interface 108 can implement the group detection logic 118 to utilize other signals, such as contextual information (e.g., time of day, day of week) and the current location of other consumers that are pre-associated with the same group, to detect that the initiated order is for a group order.

As another addition or variation, the order interface 108 can implement the group detection logic 118 to infer a group order based on a characteristic of food items which the consumer has selected. For example, if the proportion of one or more prepared food items is for more than one user, or if one of the prepared food items is a preferred food item of another member of the group, the order interface 108 may infer the order in progress is for a group order. Still further, the order interface 108 can, based on a preference, setting or most recent order, infer the order in progress is for a group order.

In some implementations, the group identified by the order interface 108 is assumed to be static, meaning that each member of the pre-associated group is assumed to be a recipient of a portion of the delivery order at each instance a group order is detected for that group. For example, the order interface 108 can infer that when an order process is initiated in a household and is determined to be a group order, the relevant group has each member of the household as a member. In such implementations, no determination of group size or members is made, other than an initial determination that the order process initiated by the consumer is for a group.

As an addition or alternative, the order interface 108 can automatically detect the members of a group order. By way of example, the order interface 108 can implement the group determination logic 118 to automatically detect one or more members of a group based on at least one of a known association amongst multiple consumers of the group (e.g., consumers with linked profiles or consumers who have historically placed orders at the same location) and/or the current location of multiple consumers indicating colocation (and thus a potential group order). In such examples, the order interface 108 can determine that (i) an order initiated by the requesting consumer is a group order, and (ii) make a determination as to at least one of a size of the group and/or the members of the groups. In examples, the order interface 108 can implement the group determination logic 118 to detect the initiated order is for a group, and then further use other signals, such as the current location of other members of the pre-associated group and contextual information (e.g., dinner time), to determine the size and/or members of the group.

In other variations, the order interface 108 can automatically detect an initiated order process as being for a group, where at least one or more members of the group are determined on an ad-hoc basis. For example, the order interface 108 can access activity information of the consumer to identify a calendar event, or use other information that indicates the consumers with respective profiles in the profile store 125 are together when an order process is initiated by one of the consumers.

According to examples, the order interface 108 can provide feedback content 115 to the service application 106 of the requesting consumer computing device 102. The feedback content 115 can be in the form of a recommendation, suggestion or modification to a food item that the user has selected while the process for completing the delivery order is in progress. In examples, the order interface 108 can provide input signals to a recommendation engine 140. The recommendation engine 140 can be integrated with the order interface 108, or provided as a separate service or functionality of the system 100. Based on the input signals, the recommendation engine 140 generate feedback content 115, which can be provided as content provided on the consumer computing device 102 via the service application 106. The feedback content 115 can include messages and/or visual elements which display recommendations and/or suggestions, or otherwise provide guidance for the user in making selections of food items.

In some variations, the feedback content 115 can also be interactive to invite a response (e.g., consumer accepts recommendation). In such examples, the recommendation engine 140 can implement a workflow to perform the recommended action. As described with examples provided below, the recommendation engine 140 may remove an item from the checkout bin of the order request, and/or include a new item in the checkout bin (e.g., recommended meal, or replacement meal for one previously selected).

Recommendations for Food Items Based on Requesting Consumer's Profile Information In some examples, the input signals to the recommendation engine 140 include a set of profile information retrieved from the profile store 125 using the consumer identifier 127 of the requesting consumer computing device 102. The set of consumption profile information can include, for example, historical food delivery profile information, activity profile information of the user, and/or a lifestyle preference and/or dietary restriction of the consumer. By way of illustration, the recommendation engine 140 may use the retrieved profile information 113 to determine a recent exercise the consumer performed, as well as a lifestyle preference and/or dietary restriction of the user. The recommendation engine 140 can associate the lifestyle preference and/or dietary restriction with one or more nutritional parameters, including quantity of food (e.g., by calories and/or weight) as well as type of food items selected. The nutritional parameters can further be weighed by, for example, contextual information (e.g., time of day, weather). Additionally, the recent exercise the consumer performed can further weigh selection of food items in favor of specific food characteristics (e.g., select high-protein food item for user after exercise). Thus, for example, the recommendation engine 140 can select food items based on a fitness objective, which the recommendation engine 140 can correlate to parameters such as calories, saturated fats, sugars, and/or other factors. The recommendation engine 140 can query the supplemental service information 145 associated with records 135 of suppliers in the range of the consumer, and further weigh selection of food items based on known preferences of the user (e.g., comparison to past orders). Moreover, the recommendation engine 140 can exclude restrictions in terms of making a recommendation. Based on the profile information 113 that is retrieved for the consumer, the recommendation engine 140 can generate a query to retrieve food items that meet criteria that match a fitness objective of the user, whether that fitness objective is specified by the consumer or implied by information extracted from the consumer's activity monitoring resources.

In some variations, the profile information retrieved for the consumer can also indicate an appetite level of the consumer. For example, profile information that can indicate appetite level can include heavy exercise in the time period immediately preceding the food order. In such an example, if the consumer expended himself with heavy exercise, the recommendation engine 140 can weigh a parameter of immediacy with respect to making a recommendation to the consumer. As another example, the appetite level of individual consumers may be estimated based on information that indicates when the consumer last ate. For example, the recommendation engine 140 may identify an order request as being for a particular mean (e.g., dinner), which is later in day than the usual time for dinner, or as compared to prior instances when the requesting consumer placed an order for dinner. The appetite level determination can weigh the recommendation engine 140 to recommend food items from a preferred or selected supplier of the consumer based at least on preparation time. For example, the recommendation engine 140 can generate the query to identify, from the supplemental service information 145, those food items which (i) are prepared to quickest, (ii) satisfy a food preparation time threshold (e.g., can be prepared in less than 20 minutes), or (iii) do not exceed an upper threshold with respect to food preparation time.

In some variations, the determined appetite level can also weigh selection of food items based on quantity. For example, if the recommendation engine 140 processes the retrieved profile information 113 to determine the user is hungry, the recommendation engine 140 may weigh against selecting a light meal. Likewise, the recommendation engine 140 can respond to the appetite level by suggesting to the consumer, through the order interface 108, an additional side, desert, or appetizer, or a different combination of prepared food items to increase caloric intake and/or protein.

Recommending Additional Items

As an addition or variation, the input signals to the recommendation engine 140 can include selections of the consumer device for specific food items from the interactive menu 109. The recommendation engine 140 may supplement the selection of the consumer by suggesting a second item. The suggestion may be based on a preference or taste of the user. Alternatively, the recommendation engine 140 may access supplemental information about the selected food item to determine one or more nutritional parameters. The recommendation engine 140 may suggest a second item to further, for example, a fitness objective of the user. For example, the recommendation engine 140 may display food items from a supplier which would, when combined with the first selection of the user, enable the food intake of the consumer to remain within a dietary goal (e.g., total calories below a meal threshold, or total sugars below a gram count, etc.). As an addition or alternative, the recommendation engine 140 may use the activity profile information (or other profile information, such as typical meal size of the consumer) to select the second food item to match the appetite level of the consumer.

Still further, the recommendation engine 140 may reference one or more selections of the user against the supplemental service information 145 in order to determine ingredients and/or nutritional information which violate the consumer's dietary restrictions, or alternatively, conflict with the user's fitness or dietary objectives. If an item that is selected by the consumer is flagged as contradicting a dietary restriction or fitness/dietary objective, the recommendation engine 140 may generate an output that includes a message or other indicator that identifies the particular food item, and the ingredient or other information which is in conflict with the consumer's dietary restriction. In some variations, the recommendation engine 140 may also suggest an alternative for the user. For example, the recommendation engine 140 can query alternative food items which exclude the nutrition parameter and/or offensive ingredient, while meeting other thresholds and criteria of the user's dietary or fitness objectives.

Group Order Recommendations

According to some examples, the recommendation engine 140 receives an input signal of group size from the order interface 108 implementing the group detection logic 118. As an addition or alternative, the recommendation engine 140 can receive an input that identifies the members of an identified group by consumer identifier 127. The recommendation engine 140 can, in connection with other input signals as described, make recommendations that are based on a determination of the delivery order request being for a group.

In some examples, when a group order determination is made, the recommendation engine 140 can retrieve a set of consumption profile information for each member of the group. Thus, for example, the recommendation engine 140 may retrieve, for each member of the group, profile information that includes historical food delivery profile information, activity profile information of the user, and/or a lifestyle preference and/or dietary restriction of the member. Similarly, the recommendation engine 140 can make the same determinations for members of a detected group as those made for a requesting consumer. The recommendation engine 140 can generate the feedback content 115 for the requesting consumer, in order to suggest or guide selections of the requesting consumer, who may not know of the specific preferences or needs of each member of the group.

In other examples, the recommendation engine 140 can determine a preference of each group member for a particular food item, food type or genre, and/or portion size based on, for example, historical food delivery profile information relating to that consumer. Still further, the recommendation engine 140 can use activity profile information of individual members of the group to determine that one or more of the groups member recently exercised. Likewise, the recommendation engine 140 can use the profile information about a lifestyle preference and/or dietary restriction of the user to identify food items which violate a dietary restriction (e.g., allergy to soy) or fitness/dietary objective of the particular consumer.

According to examples, the recommendation engine 140 can determine recommendations for group orders based on profile information about individual group members, but the recommendation engine 140 may apply the recommendations without any specificity to members of the group. For example, the recommendation engine 140 can use the profile information to determine the portion size for each member of the group, and as part of the determination, the recommendation engine 140 may determine that one member of the group is likely to have a greater appetite level than usual. In such an example, the recommendation engine 140 may increase a recommended portion size for the whole group.

In other variations, the recommendation engine 140 can tailor feedback content 115 to address a preference or need of a specific member of the group. For example, the recommendation engine 140 can suggest a food item for a particular member that is determined to be have a greater appetite level, based on the determination that the particular group member recently exercised.

As an addition or alternative, the recommendation engine 140 may provide recommendations that are non-specific to profile information. For example, the recommendation engine 140 may provide recommendations that are directed to a size of the group, or a classification (e.g., adult, male, female, child, etc.) of individual members of the group (e.g., group includes two adults, two children). Still further, the recommendation engine 140 may categorize each member of the group based on profile information associated with that consumer (e.g., big portion, normal portion, etc.). Still further, the recommendation engine 140 may provide recommendations that are contextual and specific to a particular member of the group (e.g., group member who recently exercised is likely to have an appetite level that exceeds what is expected typically). The recommendation engine 140 may provide recommendations that increase the quantity of portions to the group as a whole, by determining an overall portion size for each member of the group.

As an addition or variation, the recommendation engine 140 can determine recommendations for individual group members based on their profile information. Based on the determinations of the recommendation engine 140, the feedback content 115 can (i) suggest a food item from a supplier, given a determination made from profile information of a given member of the group; (ii) flag or warn that a selected food item violates a dietary constraint or fitness/dietary objective of a member of the group; (iii) suggest an alternative food item for the group order, based on one of the selected food items being determined as violating a dietary constraint or fitness/dietary objective of a member of the group; and/or (iv) suggest quantities, such as the number of food items or portions that should be included in the group order, or suggesting an alternative larger size portion which the requesting consumer may not know is available.

Still further, in some examples, the recommendation engine 140 can make recommendations to the requesting consumer based on a determination that the food preparation time will exceed a preference of one of the members of the group. For example, if the recommendation engine 140 determines that one of the members of the group recently exercised, or that a member of the group is a child, the recommendation engine 140 can generate a suggestion on selecting food items that can be prepared in less than an allotted threshold duration. For example, the recommendation engine 140 may determine that one food item ordered by the group is likely to delay the delivery order by ten minutes, in which case the recommendation engine 140 may suggest to the consumer to select an alternative food item (or suggest the alternative food item) in place of the original item.

In a variation, the recommendation engine 140 can suggest another supplier who may have a similar set of food items and whom is more likely to prepare the food items in less time. In such an example, the recommendation engine 140 may generate a message on the requesting consumer's mobile device, suggesting the alternative supplier, and providing reasons for the alternative suggestion (e.g., "Some members of your party may be hungry, and this restaurant as an expected food preparation time of 45 minutes. Would you like to try ABC restaurant, which can supply the same meals in 25 minutes?"). In some variations, the recommendation engine 140 can act on the recommendation. For example, the recommendation engine 140 may remove the items from the checkout bin, and then signal the service application 106 to navigate to the menu items of the recommended supplier. The recommendation engine 140 can also select items from the recommended supplier, so the requesting consumer is ready to checkout.

Associating Items with Members of Group

In making the recommendations, some variations provide that food items selected by the requesting consumer are automatically associated with a group member, or alternatively, marked as shared by two or more members of the group. The recommendation engine 140 can determine recommendations based on selections made for individual members of the group.

According to examples, the recommendation engine 140 may include group matching logic 142 to match selected food items to a member of a group. For example, the recommendation engine 140 can use historical food delivery profile information to match a particular food item to a particular member of the group. To illustrate, if one member of the family routinely orders the same meal from a particular restaurant, the recommendation engine 140 may automatically associate the food item with that member. Similarly, if one member of the group is known from their respective profile information to have an aversion to a particular ingredient (e.g., cheese), the recommendation engine 140 can deduce that a food item with that particular ingredient is not for that member. Likewise, if a member of the group has a strong affinity for a particular food item, the recommendation engine 140 may infer that a food item where the ingredient is heavily used is for that group member.

In an implementation, the recommendation engine 140 may implement the group matching logic 142 during the ordering process. In a variation, the recommendation engine 140 may implement the group matching logic 142 after the ordering process is complete. In some variations, the recommendation engine 140 may communicate to the supplier a packaging preference that meets a preference of the group, or member of the group. For example, if a food item is determined to be for a child, the recommendation engine 140 may communicate to the supplier to include packaging suitable for children.

Methodology

Figure 2:
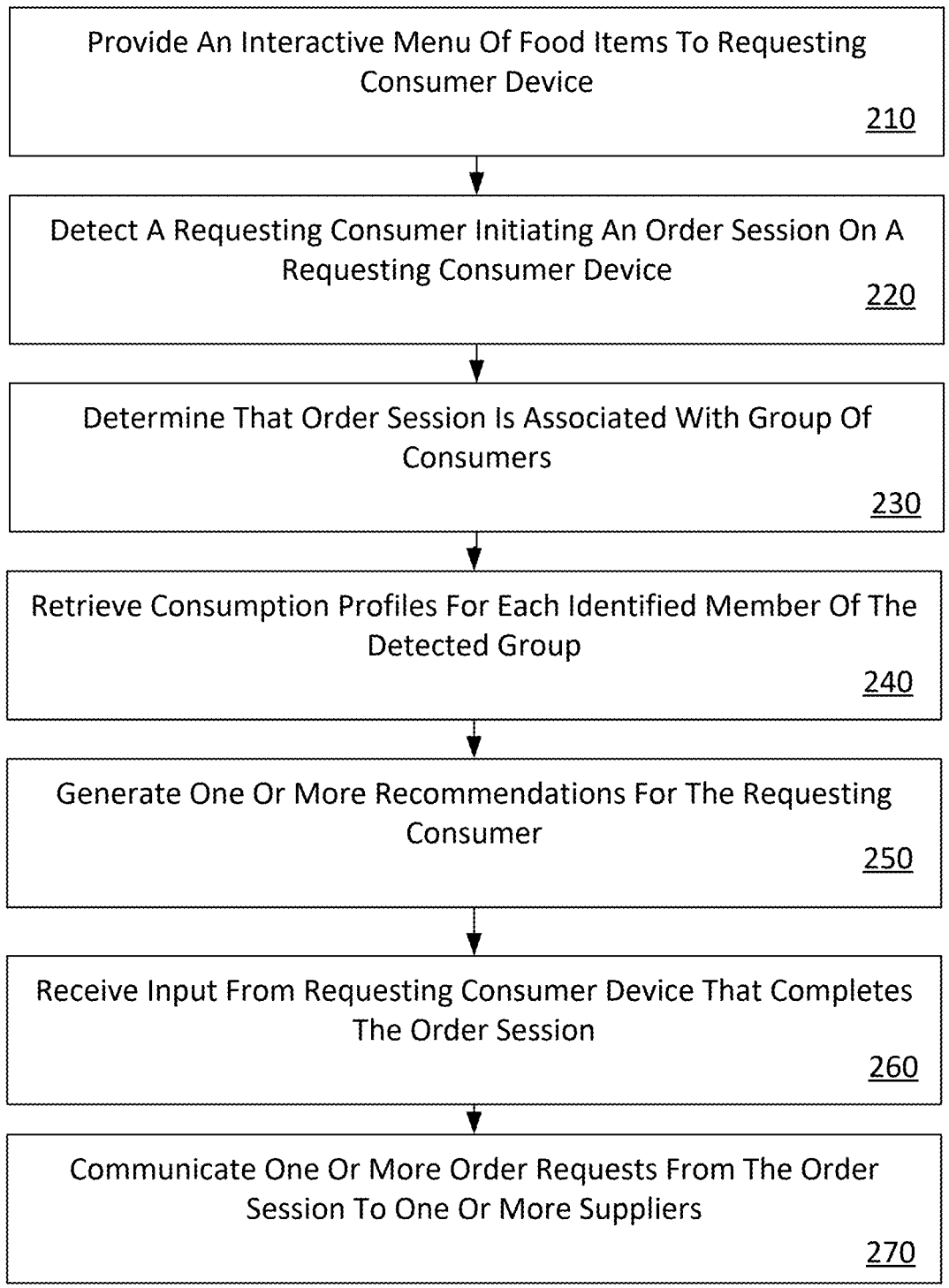
FIG. 2 illustrates an example method for recommending food items for a delivery order based on a determination that the delivery order is for a group.
Figure 3:
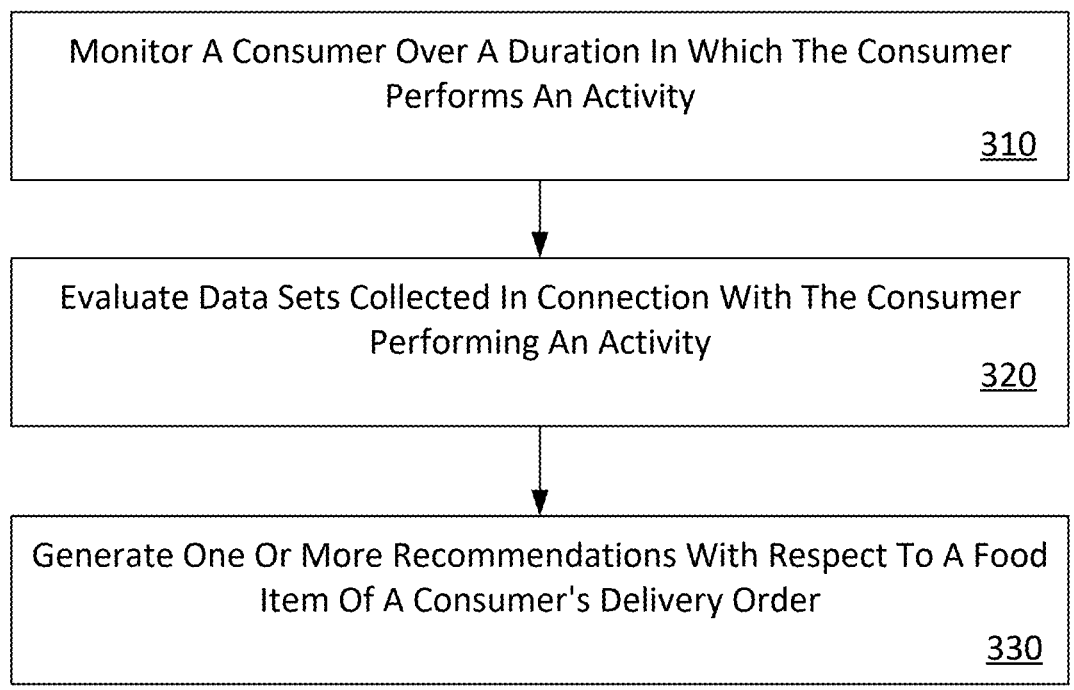
FIG. 3 illustrates an example method for making a recommendation to a delivery order based on an activity profile of a requesting consumer.

FIG. 2 illustrates an example method for making recommendations for a delivery order based on a determination that the delivery order is for a group. FIG. 3 illustrates an example method for making a recommendation to a delivery order based on an activity profile of a requesting consumer. In describing examples of FIG. 2 and FIG. 3, reference is made to elements of an example of FIG. 1 for purpose of illustrating a suitable component for performing a step or sub-step being described.

With reference to an example of FIG. 2, the system 100 provides an interactive menu 109 of food items to the requesting consumer device (210). The interactive menu 109 of food items can be provided by the service application 106 running on the consumer's device 102. The consumer can interact with the interactive menu 109 by, for example, selecting a supplier (e.g., restaurant), a genre or type of food (e.g., Italian), a specific food item (e.g., hamburger), through searching (e.g., for keywords like 'pasta') or other navigation or search mechanisms. By way of illustration, a restaurant can be associated with one or multiple menus, with each menu listing food items that can be ordered from that restaurant, along with the description of the food items, pricing information, reviews or various other kinds of information.

In variations, the interactive menu 109 can be rendered to the requesting consumer in a format that structures food items to recommendations (e.g., preferences), independent of the supplier of the food item. In such variations, the system 100 can select, from an input signal of consumer computing device 102 (e.g., location information 107), multiple suppliers who can have their prepared food items batched for delivery. The interactive menu 109 can then display content from individual records of each of the suppliers that are identified for batch delivery, where selected food items are displayed independent of the supplier. Thus, the interactive menu 109 may display or recommend multiple food items at one time for selection by the requesting consumer, with each of the food items being supplied from a different supplier.

The system 100 can detect a requesting consumer initiating an order session on a requesting consumer device (220). In examples, the order interface 108 can detect an interaction between the user and an interactive menu 109. As an addition or variation, the order session can be initiated by the requesting consumer launching the service application 106, or from the requesting consumer opening the interactive menu 109 from the launched application. Still further, in other variations, an order session can be associated with when the consumer actively engages the interactive menu 109, such as by when the interactive menu is open, or navigated through inputs of the consumer (e.g., the consumer scrolling up or down, making selections of interactive image elements representing food items, entering alphanumeric search terms, etc.).

According to some examples, the system 100 can determine whether to associate the order session with a group of consumers that include the requesting consumer (230). In an example, the order interface 108 can implement the group detection logic 118 to detect whether the order is to be a group order. In an implementation, a determination as to whether an initiated order session is for a group order can be binary, meaning the system 100 determines that the order session is either for a singular order or group order. In the variation, the determination can identify a group, or members of a group that are pre-associated with the requesting consumer. In such implementations, the determination can identify a group size and/or identifiers for individual members of the pre-associated group. Still further, the group size and constituents can be dynamically determined. According to examples, the group determination can be made at an initial time (e.g., before any order is received) based on, for example, profile information of the requesting consumer and/or contextual information. For example, the order interface 108 may base the determination on profile information of the requesting consumer indicating that the requesting consumer typically places group orders when at a given location and/or at a particular time of day or day of week.

As an addition or alternative, the order interface 108 may make the determination that an order of a requesting consumer is for a group, based on profile information and/or contextual information received from other consumers who are pre-associated with a group of the requesting consumer. For example, when the requesting consumer initiates an ordering process from his home, the order interface 108 may obtain location information from other consumers that are pre-associated with the requesting consumer, and who have consented to have their location checked for group ordering purposes. If the current location of the other members indicates they are co-located with the requesting member (e.g., members of a family are home), the order interface 108 may determine that the order is a group order. Likewise, the timing of when the process initiated (e.g., dinner time) may weigh for or against the determination that the order is for a group. Still further, in other examples, the determination of a group order can be based on the system 100 linking the requesting consumer to another consumer based on information such as both consumers being located at a common location (e.g., as determined from satellite receiver on each consumer's device), and each consumer browsing or reviewing the same menus (e.g., from same restaurant) at the same time.

In response to making the group determination, the system 100 can retrieve consumption profiles for each identified member of the detected group (240). The consumption profiles can include historical food delivery profile information, activity profile information of the user, and/or a lifestyle preference and/or dietary restriction of the consumer.

The system 100 can generate one or more recommendations for the requesting consumer, based at least in part on (i) the retrieved food consumption profile of the one or more consumers of the group, and (ii) an interaction between the requesting consumer and the interactive menu (250). The recommendation can be provided during the order session as content that is output to on the requesting consumer device. In variations, the recommendation can be provided in the form of a message, notification or alert, or visual guide. The recommendation can include text, images and/or functional elements that can perform a task. To illustrate the latter example, the recommendation can be integrated or otherwise provided with an interactive element (e.g., menu element for recommended food item) that can be selected by the user to cause the user device to navigate to the recommended food item.

According to examples, the system 100 can generate recommendations that identify specific food items which the requesting consumer can order based on a preference of the particular member. As an addition or variation, the recommendations can flag food items for removal (e.g., the requesting consumer ordered too much food for the group), suggest substitutions, or change the portion size of a selected food item. In other variations, the system 100 can recommend food items from a different supplier, such as the case where another restaurant may prepare the same meals in less time.

In some examples, the system 100 can generate recommendations for food items that match to an objective or activity of one or more members of the group. For example, the system 100 may recommend food items based on nutritional information associated with each of the items, in order to meet a dietary or fitness objective of one or more members of the group, and/or to supplement activity (e.g., exercise) that one or more members of the group performed in the preceding time interval (e.g., select high-protein meal for member who exercised).

In some examples, the system 100 can generate recommendations as to the quantity (e.g., number of servings or portions in the group order, caloric intake of the group order, etc.) of food items that the requesting consumer has selected, based on a size of the detected group. To illustrate, the recommendation can suggest more or fewer food items, as well as alternative food items which the consumer can order that are for the same or similar food item, but for a different portion (e.g., recommend family size for same dish, or item from children's menu).

As an addition or variation, the recommendation as to quantity can consider profile information of individual members of the group, including profile information that is indicative of a quantity that each member can be expected to consume during the current meal. The system 100 can estimate the quantity which each member of the group may consume based on, for example, a determination of the typical amount each member normally consumes (e.g., based on historical food delivery profile information), a size, age or gender of each member, and/or activities that one or more of the members performed during a recent time interval which may have impacted that member's appetite level.

In other examples, the system 100 can generate recommendations that flag or warn the requesting consumers with respect to selections of specific food items during the order sessions which are problematic for one or more members of the group. For example, the system 100 can use the supplemental service information 145 to detect that a selection of the requesting consumer violates a dietary restriction of a member of the associated group.

The system 100 may receive input from the requesting consumer device that completes the order session (260). The consumer may add and remove food items to an order bin, until selection is complete. In some examples, the consumer may request food items from multiple suppliers, for one (e.g., batch delivery from one transport provider) or multiple deliveries (e.g., deliveries at two different times by two different transport providers). The user can signify when the order is complete by interacting with the order bin (e.g., pressing soft button) to initiate preparation of the food items by the supplier, and to requesting delivery of the food items when prepared.

Upon receiving the completed order, the system 100 can communicate one or more order requests from the order session to the one or more suppliers, where the requests collectively can specify multiple food items for a group order (270).

With reference to an example of FIG. 3, the system 100 can monitor a consumer over a duration in which the consumer performs an activity (310). The system 100 can, for example, receive activity data, in the form of sensor data collected from movement sensors (e.g., accelerometer, gyroscope) of the consumer computing device 102. In some variations, the activity data may be collected from a wearable device, or from an application running on the consumer computing device 102 that is paired to communicate with a wearable device. The activity data can be collected in real-time and/or upon completion of an activity. In cases where the consumer is exercising, the consumer may also utilize a device that collects biometric information, such as heart-rate or blood pressure. The service application 106 can interface with such sensors, or with applications that utilize such sensors (e.g., fit tracking applications for mobile devices), to collect such biometric data. In some examples, the service application 106 transmits the collected data to the system 100.

Other information can also be collected during the interval where the sensor data is collected. For example, the system 100 can collect location information from a satellite receiver of the consumer computing device 102. The system 100 may also record the duration of the interval during which the consumer is performing an activity. In some examples, the system 100 can collect data from a wearable device which the consumer uses during his or her workout.

The system 100 can evaluate the various data sets that are collected in connection with the consumer performing an activity (320). For example, the system 100 can collect activity data that includes sensor data from movement sensors of the consumer's mobile device, biometric data (e.g., collected from a wearable device), location information and/or contextual information. In evaluating the consumer, the system 100 can also obtain information from other programmatic sources on the consumer computing device 102, such as the consumer's calendar, in order to obtain information about the user's activity (e.g., calendar application on requesting consumer's device shows exercise class).

The system 100 can evaluate the consumer's activity to determine one or more activity parameters that are characteristic of the consumer's activity. The value of the activity parameter(s) can reflect, for example, an intensity level of the activity. As an addition or alternative, the value of the activity parameter(s) can reflect a type of activity, such as a specific exercise (e.g., weight lifting, bike riding, dance) or classification of the exercise (e.g., anaerobic exercise, cardiovascular exercise, etc.).

Based on a determination of the evaluation, the system 100 can generate one or more recommendations with respect to a food item of a consumer's delivery order (330). In some examples, the recommendation engine 140 can correlate the determined activity parameters for the user activity with a target nutritional intake. The target nutritional intake can correspond to, for example, a set of nutritional values, such as calories, grams of fat or saturated fats, protein, sugars, and/or other metrics. For example, the recommendation engine 140 can correlate anaerobic exercise with an amount of protein. The target nutritional intake can also be specific to a fitness or dietary objective of the consumer. For example, the target nutritional intake can be adjusted upward or downward based on an objective of the consumer being to lose weight, add muscle, reduce cholesterol or another objective.

According to examples, the recommendation engine 140 can suggest a food item for the consumer, based on the target nutritional intake that is determined from monitoring the activities of the consumer. In variations, the recommendation engine 140 can modify an existing food item, or suggest an ingredient substitution or addition, in order to further the target nutritional intake for the consumer.

Example Interfaces

Figure 4A:
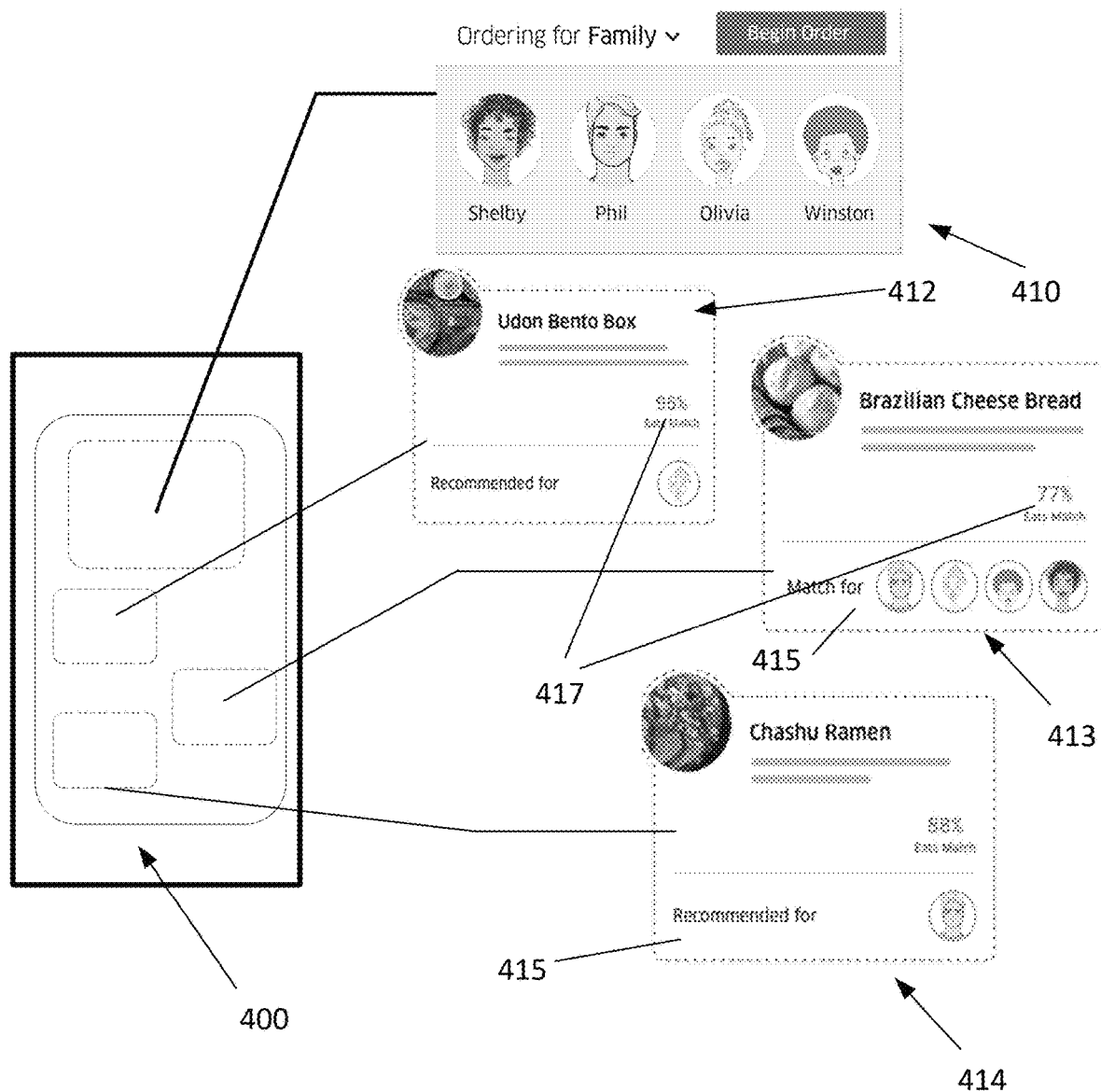
FIG. 4A and FIG. 4B illustrate an example interface for facilitating a requesting consumer in placing a group order.
Figure 4B:
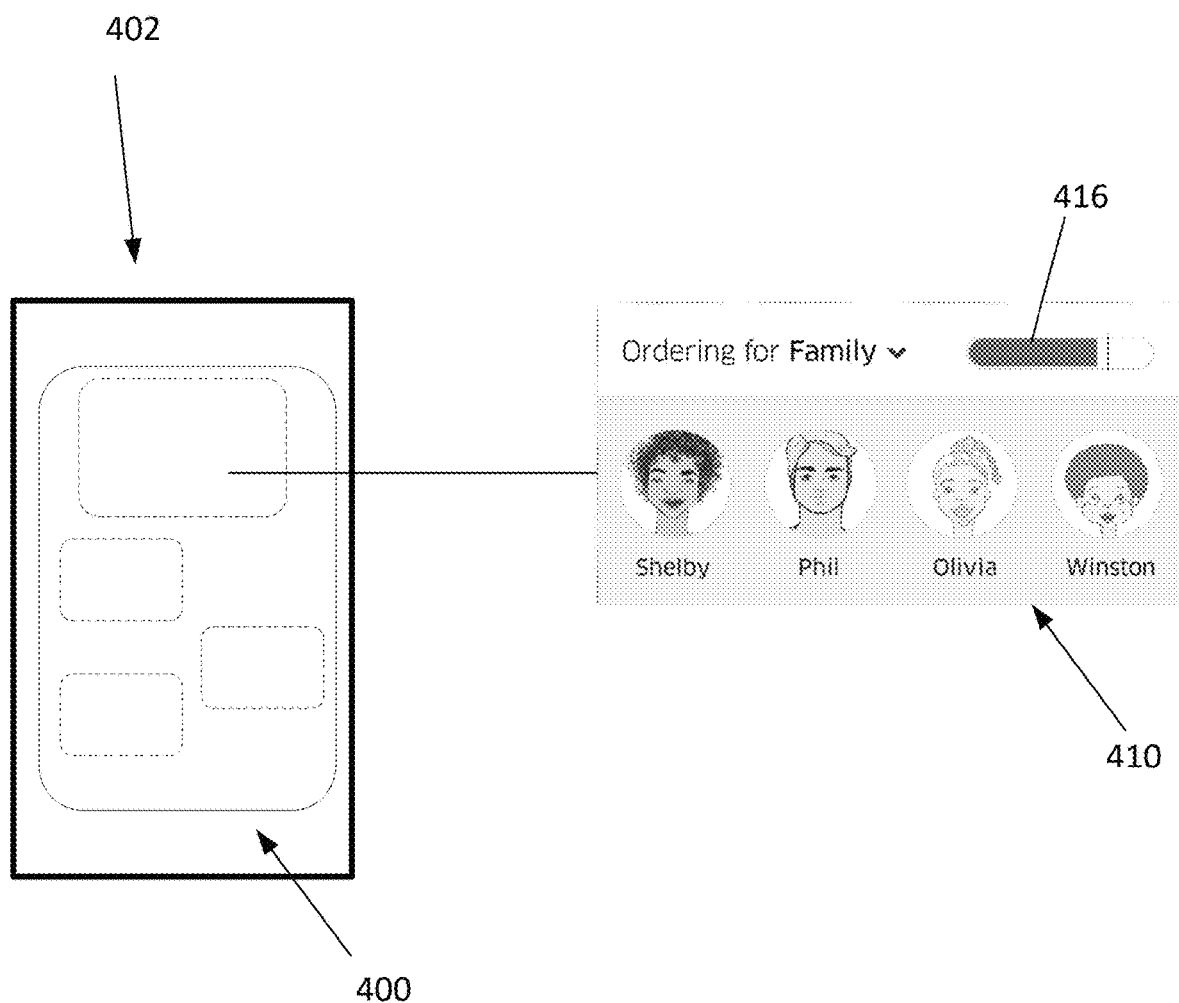

FIG. 4A and FIG. 4B illustrate an example interface for facilitating a requesting consumer to place a group order. In FIG. 4, an interface 400 can be rendered on a computing device 402 of a requesting consumer, in connection with the requesting consumer initiating an order session to place a group delivery order. The interface 400 can be generated by, for example, a service application running on the computing device 402, using data transmitted from the network computing system 100.

In an example of FIG. 4A, the interface 400 is shown in a first state. The interface 400 can include a portion which displays content panels 412, 413, 414 that each display content about a corresponding food item which the user can order. The combination of panels 412, 413, 414 can form an interactive menu which the consumer can browse, search and make selection of during an order session. As the user browses the panels 412, 413, 414, the panels may be replaced. As the user makes selections, new panels may be provided to replace selected panels, with the new panels incorporating a suggestion or recommendation of the system 100. In some examples, the recommended panels can be based in part on the user's prior selection, meaning the system 100 determines what panels to display to the consumer based in part on the user's selections. To illustrate, the system 100 may determine the order session is for a group order after a given panel selection, after which the system 100 may display panels for the group. As another illustration, the system 100 may recommend a food item that supplements the requesting consumer's prior selection, or facilitates the requesting consumer meeting a dietary or health objective.

In examples, the content for each panel 412, 413, 414 can be generated from, for example, records of the interactive menu, with individual records providing content for specific food items which can be ordered from a corresponding restaurant. When the consumer selects one of the panels, a record of the food item can be added to a checkout bin. Once the order session is completed, the system 100 can generate a delivery order from the checkout bin of the requesting consumer.

In some examples, the interactive menu that is provided to the requesting consumer can organize and display food items to the requesting consumer based on a determined interest level, with the presentation of one or more panels 412, 413, 414 being independent of the supplier of the food item. For example, each panel 412, 413, 414 can display content from a record of a corresponding food item from a different restaurant. The system 100 can pool records of food items for suppliers that are in a vicinity of the requesting consumer, and then make recommendations of food items from the pool of records. In this way, the recommended food items can be presented to the user as panels 412, 413 and 414. In examples of FIG. 4A and FIG. 4B, the number and arrangement of panels 412, 413, 414 can be selected as design parameters, device settings and user settings.

As further illustrated by FIG. 4A and FIG. 4B, the interface 400 can be generated to facilitate group orders from a requesting consumer. In examples, each panel 412, 413, 414 can include a recommendation feature 415. The recommendation feature 415 can indicate a basis for a particular food item of the respective panel being recommended to the requesting consumer, for selection with the group order. In an example of FIG. 4A and FIG. 4B, the recommendation feature 415 can be recommended for a specific member of the group, or for the group.

In an example, the recommendation feature 415 can include a likeness score 417 that indicates a degree to which the respective food item matches a preference or taste of the particular member or group that the recommendation is targeted to. The group likeness score 417, which can be displayed as part of the recommendation feature 415, can be based on, for example, an average of likeness scores 417, as determined for each member of the group. For example, the likeness score 417 can be based on a degree by which each member of the group likes a particular food item (e.g., score of between 0 and 5), with the degree being determined from, for example, historical food delivery profile information for the member or the group. The historical food delivery profile information can indicate, for example, a number of instances when a specific food item was ordered from a supplier, a number of instances when the food item (e.g., margarita pizza) was ordered from any supplier, and/or the number of instances when a food item of a particular category (e.g., pizza) was ordered by the group, or members of the group. In some examples, the system 100 can also analyze the historical food delivery profile information of the group or its members to identify ingredients, style, or other characteristics of food items which the respective group or group member prefers. The likeness score 417 of the recommendation feature 415 can further reflect the preference of the individual members of the group for the specific characteristic or combination of characteristics of the individual food items.

With further reference to an example of FIG. 4A, the requesting consumer can initiate an order session by identifying a group from a group panel 410 provided on the interface 400. The requesting consumer may be associated with one or multiple groups, and the consumer may use a selection feature of the group panel 410 to designate a pre-associated group for the order session. Each member of the pre-associated group can be identified in the group panel 410.

With reference to an example of FIG. 4B, as the consumer makes selections of food items for the group, the group panel 410 can provide feedback that guides an aspect of the consumer's selection. In an example of FIG. 4B, a feedback feature 416 can be provided to indicate an expected proportion of the delivery order which the requesting consumer has made selection for during the ordering session. The proportion can be based on, for example, the selected cumulative value (e.g., total number of servings) which the consumer has selected over the course of the order selection, as compared to a target cumulative value (e.g., the total number of servings the consumer is expected to select).

While an example of FIG. 4B describes the feedback feature 416 in terms of proportions of servings, in other variations, other quantifiable measures can be used to determine the proportional value. For example, the proportional value can indicate the progress of the consumer towards completing the order session. Thus, for example, the feedback feature 416 may reflect a cumulative target value and measured value, using parameters such as provided by weight or calories of selected food items (e.g., number of calories in food item that have been selected, as compared to number of calories that is expected to be consumable from the completed delivery order).

Figure 5:
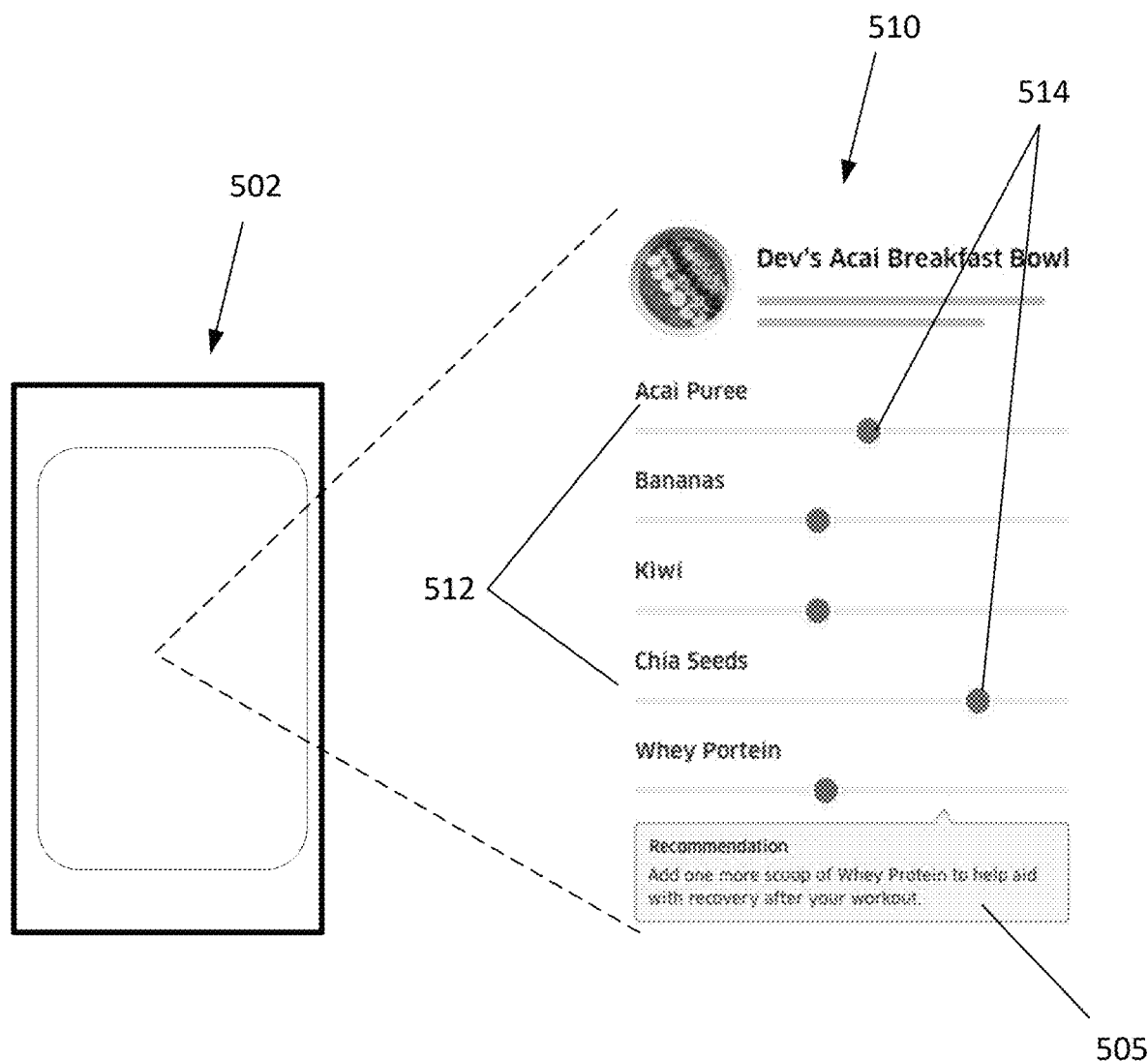
FIG. 5 illustrates another example interface for providing a recommendation with respect to a food item for a delivery order.

FIG. 5 illustrates another example interface for use with a network computing system such as described with FIG. 1. In FIG. 5, an interface 500 can be rendered on a computing device 502 of a consumer, in connection with the user making an order request for delivery of a food item. The interface 500 can be generated by a service application running on the computing device 502, using data transmitted from the network computing system 100.

In an example of FIG. 5, the interface 500 displays information about a food item which the user has selected for a delivery order. The interface 500 can display a set of nutritional attributes 512 about the order, where the nutritional attributes can reflect, for example, raw ingredients and/or other nutritional parameters. The interface 500 can further provide a set of controls 514 to enable the user to configure the food item to the user's preference. For example, the controls 514 allow the user to adjust a quantity of ingredients which are present in the food item. In other examples, the controls 514 may adjust attributes such as the amount of cooking the food item undergoes, the amount of sodium or salt which is used to prepare the food item, and/or the presence of additional ingredients and quantity thereof (e.g., number of toppings on a sandwich). The set of attributes 512 and the respective controls 514 may be specific to the food item or type of food item.

As further illustrated by an example of FIG. 5, a recommendation that is generated from the system 100 can appear as a notification 505 (e.g., text content). The notification 505 can be provided as text content to communicate the recommendation and its reasons. In an example, the interface 500 can provide the recommendation as a response to monitoring and evaluating the exercise the consumer performed in a preceding time interval. Still further, the recommendation may be related to the evaluation of the exercise the consumer performed, as well as the food item which the consumer has selected. For example, the recommendation can suggest an alteration to a quantity of one or more ingredients of the selected food item. Alternatively, the recommendation can add an ingredient to the existing food item, or a food item to the existing order. Likewise, the recommendation can suggest a substitution or removal of an ingredient from a selected food item (e.g., "Recommendation—Avoid dairy after long runs, order the sandwich and ask for no cheese"). Still further, the recommendation can remove a food item based on the evaluation of the consumer's exercise.

While an example of FIG. 5 provides recommendations that are responsive to monitoring the exercise of the consumer, in variations, the recommendations can be provided based on other types of information and events. For example, the interface 500 may display a recommendation communicated from the network computing system 100, in response to a trigger detected from contextual information (e.g., weather, time of day, day of week), as well as preferences of the user, and/or dietary or fitness objectives of the user. To illustrate, the recommendation can select a hot soup for cold weather, to meet the health objectives of the user to lose weight or to avoid unhealthy snacks.

Figure 6:
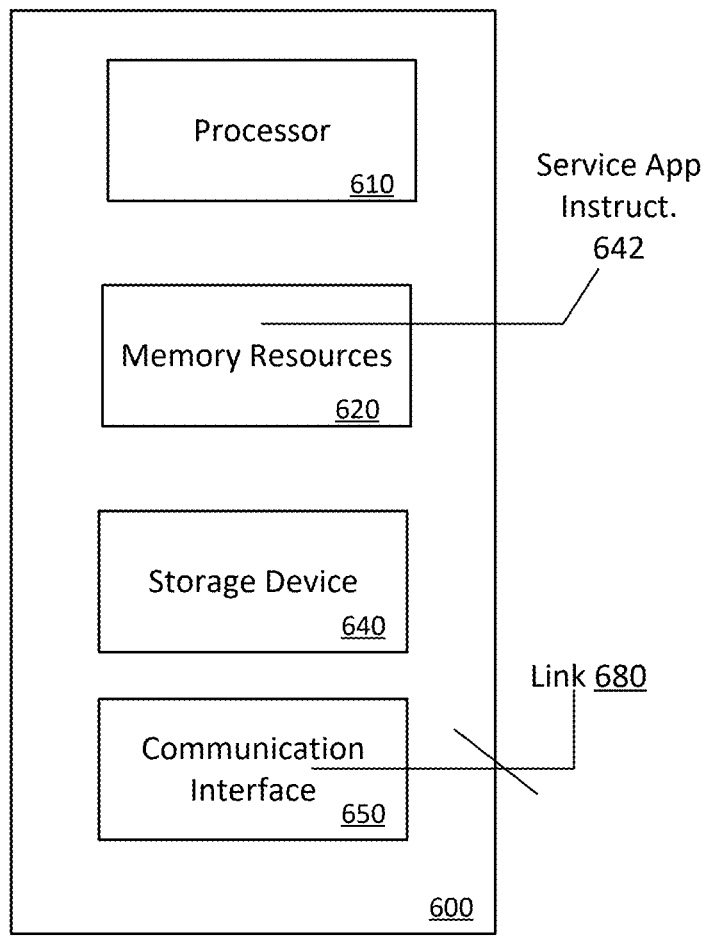
FIG. 6 illustrates a computer system on which one or more embodiments can be implemented.

FIG. 6 illustrates a computer system on which one or more embodiments can be implemented. A computer system 600 can be implemented on, for example, a server or combination of servers. For example, the computer system 600 may be implemented as part of a network computing system such as described by examples of FIG. 1. Likewise, the computer system 600 can implement a method such as described by examples of FIG. 2 and FIG. 3.

In one implementation, the computer system 600 includes processing resources 610, memory resources 620 (e.g., read-only memory (ROM) or random-access memory (RAM)), a storage device 640, and a communication interface 650. The computer system 600 includes at least one processor 610 for processing information stored in the main memory 620, such as provided by a random-access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the memory resources 620 or other static storage device for storing static information and instructions for the processor 610. The storage device 640, such as a magnetic disk or optical disk, is provided for storing information and instructions.

The communication interface 650 enables the computer system 600 to communicate with one or more networks (e.g., cellular network) through use of the network link 680 (wireless or a wire). Using the network link 680, the computer system 600 can communicate with one or more computing devices, specialized devices and modules, and one or more servers. The executable instructions stored in the memory 620 can include instructions 642, to implement a network computing system such as described with an example of FIG. 1. The executable instructions stored in the memory 620 may also implement a method, such as described with one or more examples of FIG. 2 and FIG. 3.

As such, examples described herein are related to the use of the computer system 600 for implementing the techniques described herein. According to an aspect, techniques are performed by the computer system 600 in response to the processor 610 executing one or more sequences of one or more instructions contained in the memory 620. Such instructions may be read into the memory 620 from another machine-readable medium, such as the storage device 640. Execution of the sequences of instructions contained in the memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

Figure 7:
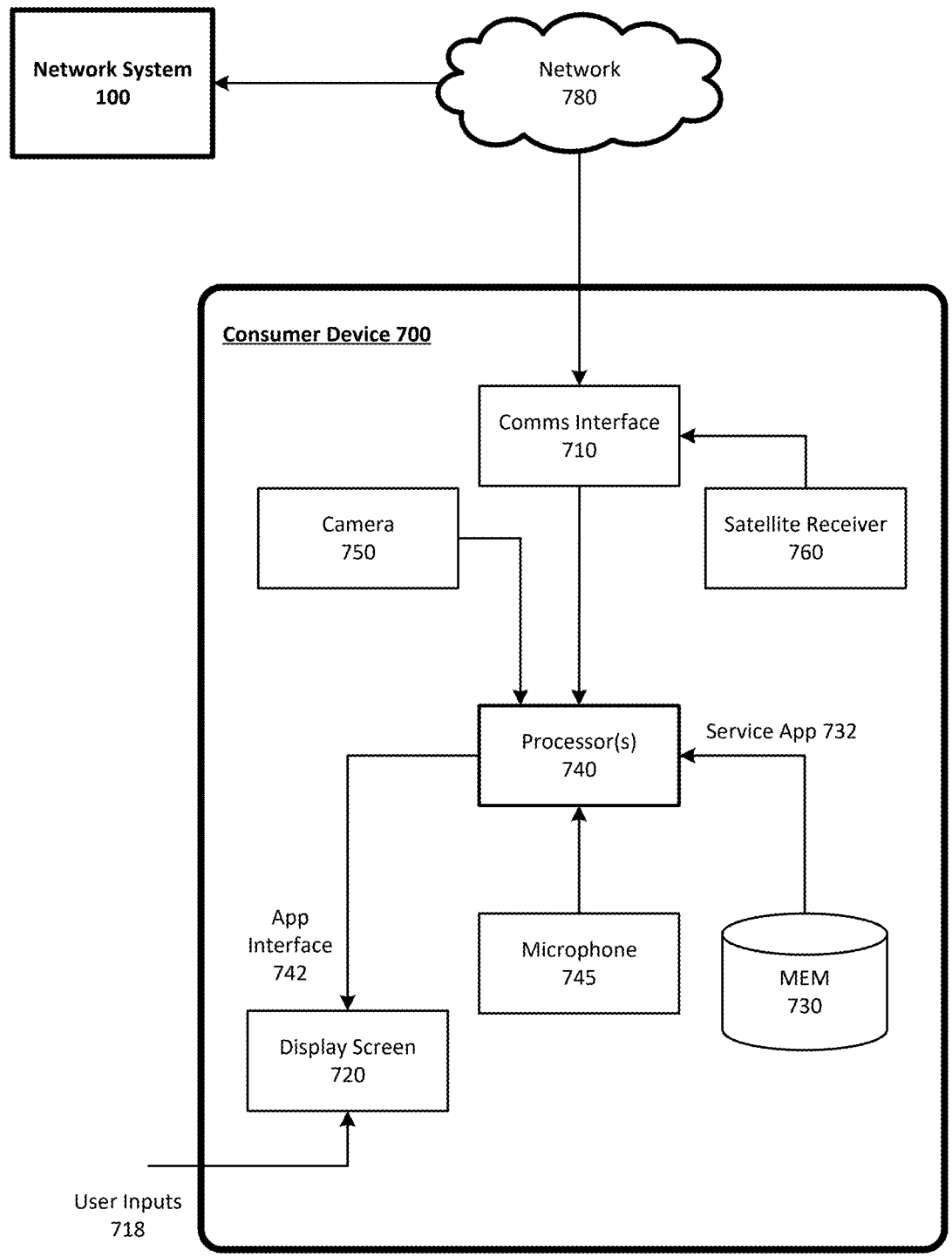
FIG. 7 is a block diagram illustrating an example consumer device for use with examples as described.

FIG. 7 is a block diagram illustrating an example consumer device for use with examples as described. In an example, a consumer device 700 can be a client device which is operable to execute a designated service application 732 for use with network computing system 100, as described with an example of FIG. 1. In many implementations, the consumer device 700 can include a mobile computing device, such as a smartphone, tablet computer, laptop computer, VR or AR headset device, wearable device and the like. As such, the consumer device 700 can include typical telephony and/or tablet features such as a display screen 720, microphone 745, a camera 750, a satellite receiver 760, and a communication interface 710 to communicate with external entities using any number of wireless communication protocols. In certain aspects, the consumer device 700 can store a designated application (e.g., a service app 732) in a local memory 730. In variations, the memory 730 can store additional applications executable by one or more processors 740 of the consumer device 700, enabling access and interaction with one or more host servers over one or more networks 780.

In response to a user input 718 (e.g., search input), the service application 732 can interact with the consumer device 700 to display menu content 119. The service application 732 can receive and use data from the network computer system 100, in order to make the menu content interactive, so that the requesting consumer can make order requests from the network computing system 100. In displaying the menu content, the service application 732 can also receive recommendations from the network computer system 100, which can be rendered on the display screen 720 as a message, visual indicator or other feature of the menu content 119.

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:
1. A network computing system, comprising:
a network communication interface to communicate, over one or more networks, with (i) computing devices of requesting consumers of an on-demand food delivery service, (ii) computing devices of transport providers that deliver food items in connection with the on- demand food delivery service, and (iii) computing devices of food preparation sources of the on-demand food delivery service;

a memory storing instructions;

one or more processors accessing the instructions to:
  receive, over the one or more networks, activity data associated with a requesting consumer, the activity data (i) being generated, at least in part, by one or more sensors of an activity monitoring device of the requesting consumer, and (ii) corresponding to exercise activity performed by the requesting consumer over a period of time;
  determine an activity profile of the requesting consumer based, at least in part, on the activity data;
  generate an interactive menu of food items to be displayed on a computing device of the requesting consumer;
  detect, over the one or more networks, the requesting consumer initiating an order session on the computing device in which the requesting consumer interacts with the interactive menu of food items;
  while the requesting consumer interacts with the interactive menu of food items, automatically determine the requesting consumer is associated with a group of consumers of the on-demand food delivery service using:
    stored information that pre-associates the requesting consumer with the group of consumers;
    a current location of the requesting consumer determined using the computing device of the requesting consumer;
    a current location of respective consumers of the group of consumers determined using respective computing devices of the group of consumers;
    a historical food delivery profile of the requesting consumer;
    the activity profile of the requesting consumer; and
    a consumption profile of the consumers in the group of consumers;
  determine (i) that the order initiated by the requesting consumer is a group order, and (ii) at least one of a size of the group or members of the group;
  generate, based at least in part on (i) the consumption profile of the group of consumers, (ii) the requesting consumer interacting with the interactive menu, (iii) the activity profile of the requesting consumer, (iv) the determination that the order initiated by the requesting consumer is a group order, (v) the current location of the requesting consumer determined using the current location of the computing device of the requesting consumer, and (vi) the current location of the respective consumers of the group of consumers determined using the current location of the respective computing devices of the group of consumers, content to be displayed via the interactive menu of food items on a display screen of the computing device of the requesting consumer, the content comprising one or more recommendations for one or more food items;
  receive, over the one or more networks, an input from the computing device of the requesting consumer, the input requesting multiple food items for the requesting consumer and the group of consumers and completing the order session; and
  communicate, over the one or more networks, one or more order requests from the order session to one or more food preparation sources, the one or more order requests specifying the multiple food items for preparation for the requesting consumer and the group of consumers.

2. The network computing system of claim 1, wherein the one or more processors further access the instructions to:
  estimate a completion time when each of the multiple food items are prepared;
  arrange at least a first transport provider to deliver the multiple food items to a location associated with the requesting consumer; and
  generate the content to display the estimated completion time and an estimated arrival time of the first transport provider to the location associated with the requesting consumer.

3. The network computing system of claim 1, wherein the one or more order requests comprises a delivery order for the requesting consumer, and wherein the one or more processors further access the instructions to:
  track a status of the delivery order for the requesting consumer.

4. The network computing system of claim 1, wherein the accessed instructions cause the one or more processors to generate the one or more recommendations based, at least in part, on a food item that the requesting consumer has selected during the order session.

5. The network computing system of claim 1, wherein the one or more processors further access the instructions to generate the one or more recommendations based, at least in part, on a selection or pre-selection made by the requesting consumer.

6. The network computing system of claim 1, wherein the one or more processors further access the instructions to:
  detect, based on an interaction of the requesting consumer with the interactive menu of food items, a user selection of a first food item from a first food preparation source;
  wherein the accessed instructions cause the one or more processors to generate the one or more recommendations by identifying a second food preparation source of a second food item that can be batch delivered with the first food item to a delivery location associated with the requesting consumer.

7. The network computing system of claim 1, wherein the one or more recommendations identify a food item from a food preparation source that the requesting consumer has indicated for selection.

8. The network computing system of claim 7, wherein the one or more recommendations are further based on a portion size of the food item that the requesting consumer has indicated for selection.

9. The network computing system of claim 8, wherein the one or more recommendations specify the portion size of the food item that the requesting consumer has indicated for selection.

10. The network computing system of claim 8, wherein the portion size is based, at least in part, on at least one of a weight or a volume of the food item that the requesting consumer has indicated for selection.

11. The network computing system of claim 8, wherein the one or more recommendations are further based on an indicated caloric intake of the one or more respective consumers in the group of consumers, the indicated caloric intake corresponding to a dietary restriction of the respective consumers.

12. The network computing system of claim 11, wherein the one or more processors further access the instructions to:

determine a cumulative total of calories for the multiple food items that the requesting consumer selects for the one or more order requests.

13. The network computing system of claim 12, wherein the content indicates the cumulative total of calories.

14. The network computing system of claim 13, wherein the content displays the cumulative total of calories as compared to the indicated caloric intake corresponding to the dietary restriction.

15. The network computing system of claim 1, wherein the consumption profile of the group of consumers is based on one or more prior order requests from the group of consumers.

16. The network computing system of claim 1, wherein the consumption profile of the group of consumers is based at least in part on at least one of an age or gender of the respective consumers.

17. The network computing system of claim 1, wherein the consumption profile of the group of consumers is based on at least one of a dietary restriction or dietary goal of the respective consumers.

18. The network computing system of claim 1, wherein the consumption profile of the group of consumers is based at least in part on activity information that identifies an activity that the respective consumers performed during a designated time interval preceding the order session.

19. The network computing system of claim 18, wherein the activity information further identifies at least one of an amount, an intensity, or a type of exercise by the respective consumers.

20. The network computing system of claim 18, wherein the one or more processors access the instructions to retrieve the activity information from an activity monitoring device of the respective consumers.

21. The network computing system of claim 1, wherein the accessed instructions cause the one or more processors to associate the order session with the group of consumers based on information stored in an account of the requesting consumer.

22. The network computing system of claim 1, wherein the accessed instructions cause the one or more processors to associate the order session with the group of consumers based on an input received from the computing device of the requesting consumer.

23. The network computing system of claim 1, wherein the one or more processors further access the instructions to:
determine the requesting consumer is collocated with the group of consumers based on the current location of the requesting consumer and the current location of the respective consumers of the group of consumers.

24. The network computing system of claim 23, wherein the one or more processors further access the instructions to:
generate the one or more recommendations for one or more food items based on:
historical food delivery profile information of at least one consumer of the group of consumers.

25. A non-transitory computer readable medium that stores instructions, which when executed by one or more processors of a network computing system, cause the network computing system to perform operations that include:
communicating, over one or more networks, with (i) computing devices of requesting consumers of an on-demand food delivery service, (ii) computing devices of transport providers that deliver food items in connection with the on-demand food delivery service, and (iii) computing devices of food preparation sources of the on-demand food delivery service;
receiving, over the one or more networks, activity data associated with a requesting consumer, the activity data (i) being generated, at least in part, by one or more sensors of an activity monitoring device of the requesting consumer, and (ii) corresponding to exercise activity performed by the requesting consumer over a period of time;
determining an activity profile of the requesting consumer based at least in part on the activity data;
generating an interactive menu of food items to be displayed on a computing device of the requesting consumer;
detecting, over the one or more networks, the requesting consumer initiating an order session on the computing device in which the requesting consumer interacts with the interactive menu of food items;
while the requesting consumer interacts with the interactive menu of food items, automatically determining the requesting consumer is associated with a group of consumers of the on-demand food delivery service using:
stored information that pre-associates the requesting consumer with the group of consumers;
a current location of the requesting consumer determined using the computing device of the requesting consumer;
a current location of respective consumers of the group of consumers determined using respective computing devices of the group of consumers;
a historical food delivery profile of the requesting consumer;
the activity profile of the requesting consumer; and
a consumption profile of the group of consumers;
determining (i) that the order initiated by the requesting consumer is a group order, and (ii) at least one of a size of the group or members of the group;
generating, based at least in part on (i) the consumption profile of the group of consumers, (ii) the requesting consumer interacting with the interactive menu, (iii) the activity profile of the requesting consumer, (iv) the determination that the order initiated by the requesting consumer is a group order, (v) the current location of the requesting consumer determined using the current location of the computing device of the requesting consumer, and (vi) the current location of the respective consumers of the group of consumers determined using the current location of the respective computing devices of the group of consumers, content to be displayed via the interactive menu of food items on a display screen of the computing device of the requesting consumer, the content comprising one or more recommendations for one or more food items;
receiving, over the one or more networks, an input from the computing device of the requesting consumer, the input requesting multiple food items for the requesting consumer and the group of consumers and completing the order session; and
communicating, over the one or more order networks, one or more order requests from the order session to one or more food preparation sources, the one or more order requests specifying the multiple food items for preparation for the requesting consumer and the group of consumers.

26. A method for providing a delivery service, the method being implemented by one or more processors and comprising:

communicating, over one or more networks, with (i) computing devices of requesting consumers of an on-demand food delivery service, (ii) computing devices of transport providers that deliver food items in connection with the on-demand food delivery service, and (iii) computing devices of food preparation sources of the on-demand food delivery service;

providing, over the one or more networks, an interactive menu of food items to a computing device of a requesting consumer;

detecting, over the one or more networks, the requesting consumer initiating an order session on the computing device;

during the order session, performing a group matching process to associate the requesting consumer with a group of consumers of the on-demand food delivery service by automatically determining the requesting consumer is associated with a group of consumers of the on-demand food delivery service based at least in part on:

stored information that pre-associates the requesting consumer with the group of consumers;

a current location of the requesting consumer determined using the computing device of the requesting consumer; and a current location of respective consumers of the group of consumers determined using respective computing devices of the group of consumers;

determining (i) that the order initiated by the requesting consumer is a group order, and (ii) at least one of a size of the group or members of the group;

generating, based at least in part on (i) the automatically determining the requesting consumer is associated with the group of consumers of the on-demand food delivery service, (ii) an interaction between the requesting consumer and the interactive menu, (iii) an activity profile of the requesting consumer, (iv) a determination that the order initiated by the requesting consumer is a group order, (v) the current location of the requesting consumer determined using the current location of the computing device of the requesting consumer, (vi) the current location of the respective consumers of the group of consumers determined using the current location of the respective computing devices of the group of consumers, and (vii) consumption profile information for the group of consumers, content to be displayed on a display screen of the computing device of the requesting consumer, the content comprising one or more recommendations for one or more food items;

receiving, over the one or more networks, an input from the computing device of the requesting consumer, the input completing the order session; and communicating, over the one or more networks, one or more order requests from the order session to one or more food preparation sources, the one or more order requests specifying multiple food items for preparation for the requesting consumer and the group of consumers.

* * * * *

UNITED STATES PATENT AND TRADEMARK OFFICE
CERTIFICATE OF CORRECTION

PATENT NO. : 11,449,917 B2
APPLICATION NO. : 16/122675
DATED : September 20, 2022
INVENTOR(S) : Paul Clayton Smith It is certified that error appears in the above-identified patent and that said Letters Patent is hereby corrected as shown below:

In the Drawings

Sheet 8, FIG. 7, please delete "App Interface 742"

In the Specification

In Column 20, Line 39 after the word "interface", please delete "500" and insert --510--

In Column 20, Line 42 after the word "interface", please delete "500" and insert --510--

In Column 20, Line 45 after the word "interface", please delete "500" and insert --510--

In Column 20, Line 47 after the word "interface", please delete "500" and insert --510--

In Column 20, Line 50 after the word "interface", please delete "500" and insert --510--

In Column 20, Line 66 after the word "interface", please delete "500" and insert --510--

In Column 21, Line 19 after the word "interface", please delete "500" and insert --510--

In Column 22, Line 38 after the word "content", please delete "119"

In Column 22, Line 47 after the word "content", please delete "119"

In the Claims

In Column 23, Line 41 after the word "order", please add "session"

Signed and Sealed this
Twenty-fourth Day of January, 2023

Katherine Kelly Vidal
*Director of the United States Patent and Trademark Office*

In Column 26, Line 35 after the word "order", please add "session"

In Column 27, Line 28 after the word "order", please add "session"